Dec. 14, 1965   C. F. STRAUGHAN   3,223,571
APPARATUS FOR APPLYING A PLASTIC FILM WRAPPING TO A PIPE LINE
Filed April 30, 1962   2 Sheets-Sheet 1

INVENTOR.
C.F. STRAUGHAN
BY Head & Johnson
ATTORNEYS

INVENTOR.
C. F. STRAUGHAN
BY Head & Johnson
ATTORNEYS

United States Patent Office 3,223,571
Patented Dec. 14, 1965

3,223,571
APPARATUS FOR APPLYING A PLASTIC FILM WRAPPING TO A PIPE LINE
Clemens F. Straughan, 3919 E. 38th St., Tulsa, Okla.
Filed Apr. 30, 1962, Ser. No. 191,093
6 Claims. (Cl. 156—392)

This invention relates to the wrapping of a protective film to the exterior of longitudinal members, such as tubular members and the like. More specifically, this invention relates to the longitudinal application of a protective or insulative film or wrap to a pipe line. Still more particularly this invention relates to the application of a continuous flexible plastic or synthetic film or wrap to a pipe line to protect the pipe line from corrosion, erosion and the like, the film or wrap having a single continuous longitudinal seam.

Pipe lines are typically coated with a helically wound wrap of a chemically treated paper or similar protective material. The wrapping may be applied to the pipe line after it is made up or to each individual section of pipe prior to its connection into the pipe line. The wrap in some instances is bound to the pipe by an undercoating of an adhesive, such as latex, epoxy or tar-base compounds. This further complicates the wrapping process and increases cost of the operation. Another procedure of recent development discloses extruding a plastic material onto the exterior surface of a pipe section. However, this procedure is both expensive and time consuming.

Accordingly, it is an object of this invention to provide a method and apparatus for continuous longitudinal wrapping of pipe lines that overcomes the objections to prior methods and apparatus of coating pipe.

Another object of this invention is to provide a device for the application of a protective film of a plastic material or the like to the exterior of a pipe line or the like in a "cigarette wrap" manner.

It is a further object of this invention to provide a line traveling device for applying a continuous, snug fitting, protective film of a plastic material to a pipe line or the like, the film having a single continuous longitudinal seam or lap that is sealed by the application of heat, solvents, adhesives, sonic, ultrasonic or high frequency bonding.

A still further object of this invention is to provide a line traveling device for the application of a flexible, snug fitting, protective film of a material such as heat shrinkable synthetic materials to the exterior of a pipe line or the like in a longitudinal or "cigarette wrap" manner without the necessity of incorporating a coating of liquid adhesive or protective material between the film and the pipe.

A yet additional object of this invention is to provide apparatus for longitudinally wrapping and sealing pipe continuously which is adaptable for line travel along the length of pipe or adaptable for fixed relationship with respect to line traveling pipe.

Further objects and advantages of this invention will be apparent from the following description and appended claims, reference being had to the accompanying drawings forming a part of the specification wherein like reference characters designate corresponding parts in the several views.

*General description*

Figure 1:
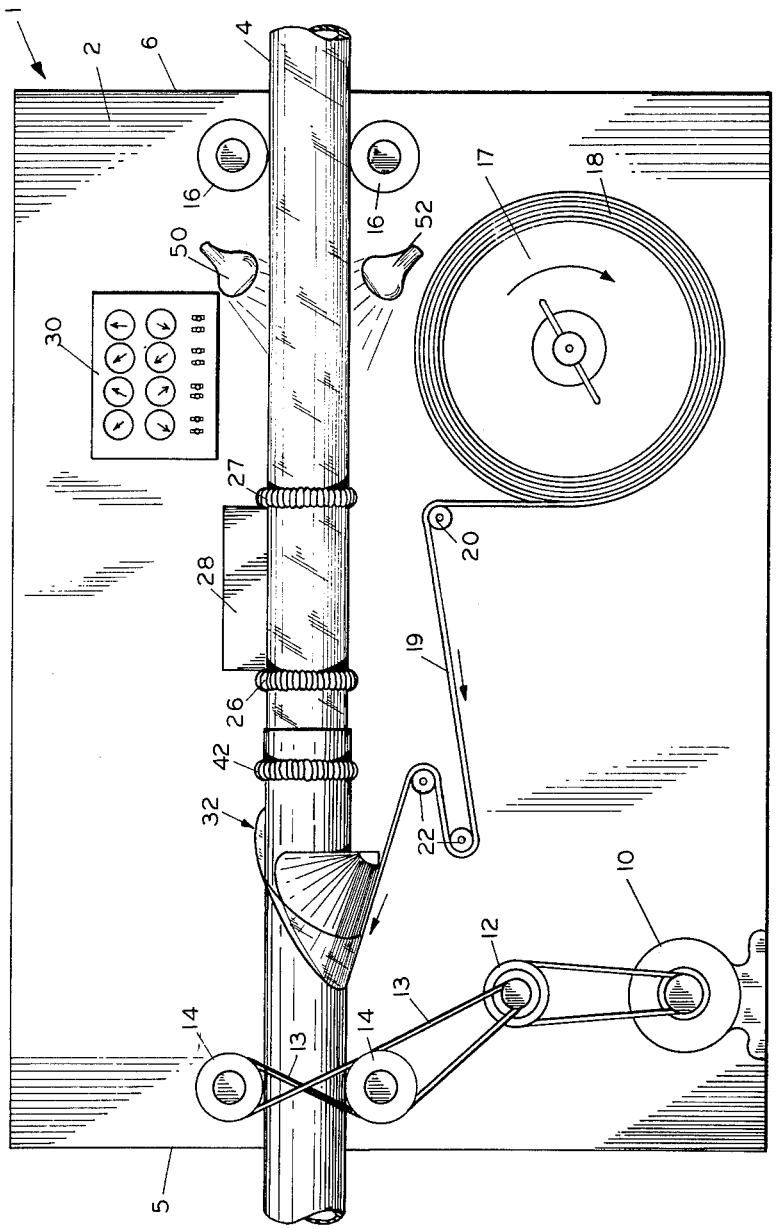
FIGURE 1 is a schematic side elevational view of the apparatus and method of this invention.
Figure 2:
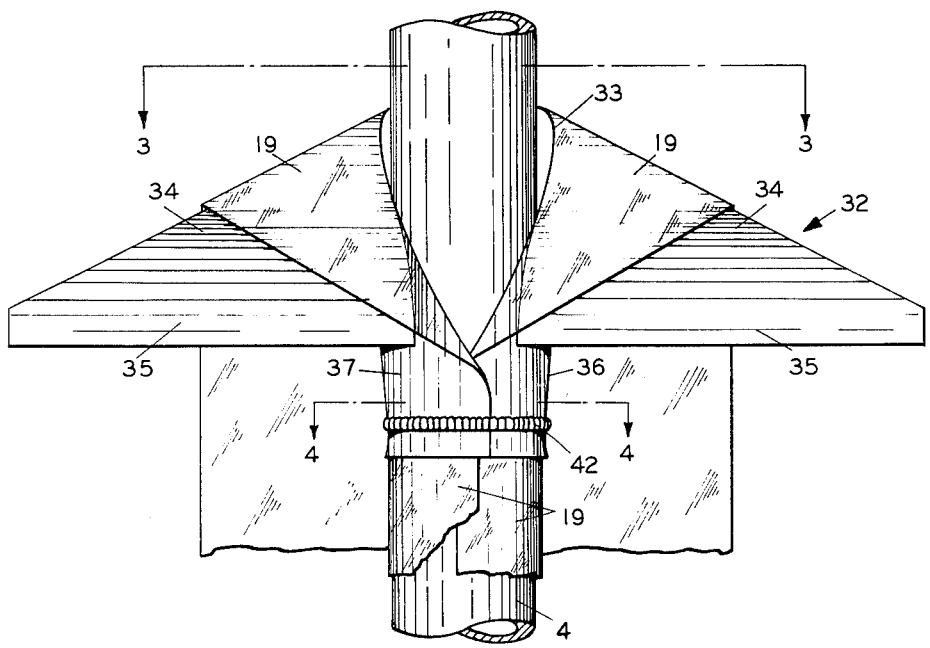
FIGURE 2 is a partial top plan view of the film folding device incorporated in this invention.
Figure 3:
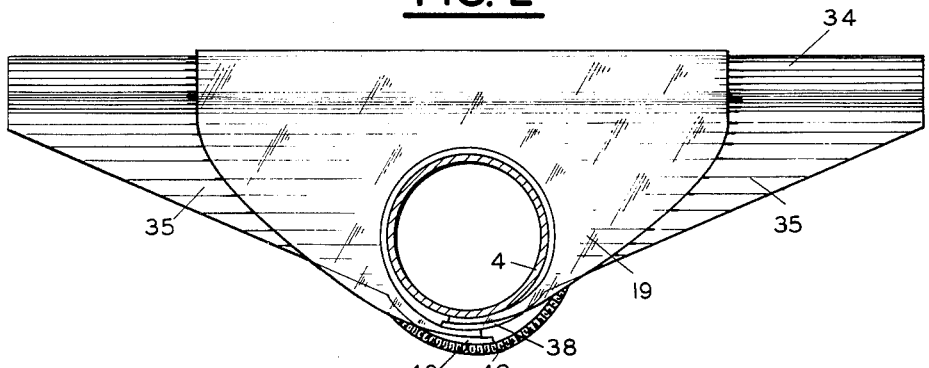
FIGURE 3 is a frontal sectional view of the folder as taken along the line 3—3 of FIGURE 2.
Figure 4:
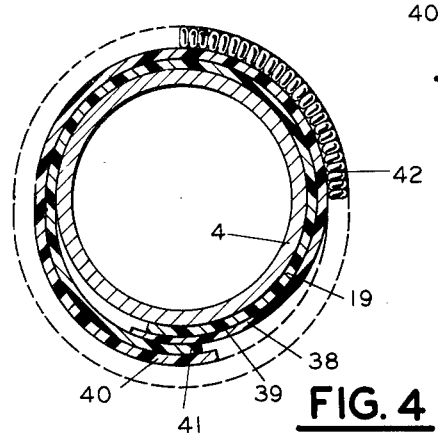
FIGURE 4 is a sectional view taken along the line 4—4 of FIGURE 2.

In general, this invention consists of a line traveling device for wrapping a pipe line or the like comprising a frame having mounted thereon a series of drive and guide rollers, a roll of film ribbon such as plastic or the like, a film folder to fold the film ribbon into a tubular shape about the pipe line, a series of circular retainer springs surrounding the folded film and a lap or seam sealing means.

*Specific description*

More specifically and referring to the drawings, this invention consists, in one embodiment, of a line traveling, pipe line wrapping device 1 having pipe or tubular body 4 extending therethrough.

The support frame 2 of the device 1 has disposed thereon a reel 17 carrying a roll 18 of thin flexible film stock, ribbon or wrapping material 19. Film 19 is made from any material that is suitably foldable or flexible and retainable about the pipe and possessing the properties necessary for the protection of metallic pipe and the like from corrosion, erosion and mechanical handling. In addition, the film or wrapping material is to be relatively strong and of low or practically nil of moisture-vapor-transmission characteristics, in addition to high insulating or dielectric properties. It has been found that many films having heat shrinkable characteristics generally possess desirable properties and are of excellent utility to this invention. This invention recognizes that the technology of thin films, especially synthetic resin films, is always advancing and that during the life of this patent, in all probability, improved films and wrappings will be developed that can be incorporated within the features of this invention.

Materials presently available having the required properties include vinyl plastics such as polyvinyl chloride, polyvinylide chloride, vinyl chloride acetate copolymers, vinyl nitrile, the styrene copolymers and cocopolymers such as polystyrene, the cellulose plastics such as cellophane, cellulose acetate, cellulose acetate butyrate, ethyl cellulose, polytrifluoromono chloroethylene (trithene), the coumaroneindene plastics, the polyamide, rubber and polyolefins such as polyethylene and polypropylene plastics and fabrics or weaves impregnated with these materials. Polyester plastics are of general applicability to this invention as is polyvinylfluoride such as sold under the trademark "Tedlar." In some instances adhesive tapes or films of the pressure-sensitive, highly stretchable and retractable type as described in U.S. Reissue Patent 23,843 are useable with this invention.

These plastics while being waterproof, tough, flexible and easily foldable also possess the highly desirable dielectric properties. Accordingly, these plastic films when coated upon pipe, not only prevent direct contact between the pipe and ground and moisture, but also effectively insulate the pipe from stray electrical currents. This combination of waterproofness and dielectric properties of these plastic films afford complete protection to the metallic pipe from all types of corrosion including electrolytic corrosion.

Although these films are generally of a thickness equal to or less than ten mils, this figure is not an absolute upper limit on the useable thickness. Generally, the pipe size, foldability, type of film and type of film folder will be one, all or some of the determining factors in deciding the upper limit on the useable thickness of a particular film. It is possible in some cases to increase the useable thickness of a particular film beyond this upper limit by preheating the film, before folding or forming it about the pipe.

The reel 17 has an internal braking mechanism (not shown) which prevents the film ribbon 19 from unrolling at a rate greater than that at which it is wrapped about the pipe line 4 which would result in its becoming tangled and snarled in the device 1.

The film stock proceeds from roll 18 over film idler roller 20, over film tension rollers 22 to the film folder 32. Film folder 32 surrounds the pipe line 4 that is to be wrapped and consists of a combination of a smooth curve, wing-shaped shoulder portion 34 and a rearward tubular portion 36. The shoulder portion 34 is made from a rigid material such as a hard plastic or a metal. A longitudinal circular opening 33 is provided in the curved surface 35 for the axial passage of the pipe 4 therethrough. The diameter of this opening is sufficiently larger than the diameter of the pipe line to accommodate any irregularities or collars in the pipe line. In one embodiment retractable centralizer rollers maintain the pipe relatively centered during the folding operation.

Extending rearwardly of shoulder portion 34 is a flexible tubular member, overlappingly split longitudinally to cause the final overlapping fold of the film 19 about the pipe 4. The split forms two leaves, underneath portion 36 and overlapping portion 37 forming the end tabs 38 and 40 respectively. Tabs 38 and 40 are expansibly retained in their overlapped position either by inherent springiness or by one or more expansible circular spring elements 42. As the film ribbon 19 is drawn over the smooth curved shoulder portion 34, it is automatically shaped into a continuous tubular wrap about the pipe 4. Film ribbon 19 is of sufficient width that its edges overlap when it is so folded about the pipe line 4. Tabs 38 and 40 function as guide members for automatically guiding the longitudinal edges of the film ribbon into the overlapped position. That is, one film ribbon edge 39, the inner one, will be drawn through the space between tab 38 and the exterior of the pipe line 4 and the other edge 41 will be drawn into and through the space between the tab 38 and overlapping tab 40.

A film sealing means 28, located behind the film folder 24, effectively seals or interconnects the overlap of the film edges 39 and 41. This sealing means may take any one of several conventional forms. Sealing of the overlapped edges may be effected by applying a suitable adhesive material or a film solvent to one of the edges, for example the outer surface of edge 39, and pressing the other edge 41 against this adhesive or solvent strip.

An alternative and highly effective method of sealing the overlapped edges of a plastic film is by the application of heat to the area of overlap. Sufficient heat must be applied to cause the overlapped edges of the plastic to partially melt and their adjacent surfaces flow together. When the edges cool, a strong seal is effected between them. Heat for such heat sealing means is commonly obtained from electrical heating elements housed in a heat conductive body that is urged against the overlapped area.

A relatively new means for sealing or splicing overlapped edges of a plastic film utilizes ultrasonic vibrations, for example, an ultrasonic vibrating member that is positioned such that it will traverse the area of overlap. Ultrasonic vibrations transmit energy through the overlapped edges of a plastic in such a way that the surfaces to be joined are brought within atomic distances of each other and thus adhere positively without application of heat or adhesives.

It is to be understood that any other sealing means for effectively sealing the longitudinal seams of this film wrap may be used without departing from the scope of this invention, as, for example, using pressure-sensitive films.

Surrounding the folded film wrap and the pipe line, between film folder 24 and sealing means 28, is circular film holding spring 26. Spring 26 serves the important function of holding the film in place about the pipe and of maintaining the longitudinal edges of the film in smooth, even, overlapped relation prior to their becoming sealed together. One or more additional circular springs 27 surround the folded film and the pipe line, immediately behind the sealing means 28, in order to retain the film in its folded position about the pipe line long enough for the seal of the overlapped edges to become effective. Although circular spring members 42, 26 and 27 are of the type adapted to roll as the pipe and film pass longitudinally, other types of rollers, etc. are to be considered as equivalent to the purpose of maintaining the film about the pipe prior to sealing and capable of radial movement with respect to the longitudinal axis of the pipe for irregularities or dimensional changes in the pipe due to collars, welds or the like.

In the preferred embodiment, heating elements 50 and 52 are located downstream of the film overlap sealer 28. The elements substantially and preferably circumferentially heat the film about the pipe. Many of the films useable in this invention shrink after the application of heat. Hence, the film becomes a protective "sausage skin" about the pipe.

Drive motor 10 and drive transmission 12 are connected by means of drive gears or belts 13 to the drive rollers 14, located on the leading end 5 of the device 1. These drive rollers are utilized to propel the entire device 1 along the stationary pipe line 4. Alternatively, the device 1 may be made stationary and the pipe line 4 propelled by means of drive rollers 14 along or through the device 1. A variable speed transmission is usually provided to permit variation in dwell time of the overlap sealing unit 28 and/or the heat shrinking phase of units 50 and 52. In some instances a grinding or deburring means is provided prior to insertion of the pipe in the film wrapping device of this invention.

Located on or near the following end 6 of the device 1 are guide rollers 16. These guide rollers maintain the device 1 properly positioned upon the pipe line 4 during the wrapping operation.

Conveniently located upon the frame 2 is a central control panel 30 which may incorporate all of the control inherent to the operation of this device. When the device 1 is made stationary and the pipe line 4 is passed therethrough, this control panel 30 may alternatively be placed at some point outside the device 1.

The power for the drive motor 10 and the sealing means 28 may be supplied from any convenient source such as an electrical generator, a storage battery or the like. In that instance the methods and apparatus of this invention are made applicable to field use, that is, wrapping of the pipe just prior to its insertion into a prepared ground trench, a portable generator unit is utilized driven by a piece of auxiliary equipment that travels with the wrapping device.

It should be noted that the relative movement of the pipeline 4 through the device 1 will draw the film ribbon 19 from the roll 18 at the necessary rate, therefore no independent film ribbon feed drive need be incorporated in the device 1.

Although this invention has been described with particular emphasis on the use of synthetic materials as the wrapping material, it is to be understood that any other material possessing the necessary protective and sealing characteristics and capable of being formed from a continuous flat flexible ribbon stage to a stage about the pipe other material may include a chemically treated, relatively moisture proof fibrous material, such as paper, glass, etc. ly moisture proof fibrous material, and as paper, glass, etc.

It must also be noted that the method and apparatus of this invention contemplate the use of primer or precoatings about the exterior of the pipe line, beneath the film wrap, to lend added protection to the pipe. An exemplary precoat would consist of a relatively thick cylindrical sheath of a highly resilient material, such as a plastic foam, that would serve as a cushion for the film thereby protecting the film and pipe from mechanical damage when the pipe line is inserted into the prepared ground trench and during trench back fill operations. In some instances a precoat would include an adhesive material to increase the bond or adhesiveness between the film wrap and the exterior of the pipe. When desirable, apparatus (not shown) for the application of such a pre-coat to the pipe line could be located on the device 1 near its leading end 5.

The invention has been described with relation to use of a reversing folder device 32 where the film comes from a rearwardly positioned roll 18. Such apparatus permits a compact unit. However, this invention is to be construed to include methods and apparatus where the roll is forward of the longitudinal wrapping apparatus. Means is provided to gradually curve and wrap the film about the pipe to cause the overlap sealable joint. Typical of such means includes a frustro-conical cylinder within which the pipe is axially moved as the film is wrapped in moving from the large diameter end to the smaller diameter end.

Initial experiments with films typical of use in the methods of this invention finds that most films carry static electric charges and cling to the pipe by the law of opposite polarity. Hence this invention includes the embodiment of longitudinally wrapping pipe or the like by creating a static charge on the film and creating, if needed, an opposite charge on the pipe. The friction movement of film about the folder or movement of the pipe within the device may be sufficient to cause the required static charges. Hence the film will cling without use of external smoothing or holding devices.

This invention has been described by reference to specific and preferred embodiments. It will be apparent, however, that many modifications can be made without departing from the spirit and scope of the invention. Accordingly, this invention should be construed not to be limited to the embodiment herein described but should be limited only by the scope of the appended claims.

What is claimed is:

1. Apparatus for applying single thickness heat shrinkable synthetic resin film to the outside surface of a rigid pipe comprising:
   a support frame;
   means associated with said frame to self-propel and guide said frame relative to said pipe in a forward direction;
   a wing shaped film holder having a longitudinal opening to perimt axial movement of said pipe and supported to said frame, the forward rounded edge of said folder extending outwardly and rearwardly from said opening, the upper surface smoothly tapered downwardly and forwardly to said forward edge, the lower surface smoothly rounded upwardly and forwardly to said forward edge;
   a substantially tubular portion coaxially extending about said pipe rearwardly from said folder and having longitudinal overlapping split leaves along its upper surface, said leaves spring-flexible to permit expansion and contraction of said leaves;
   a supply roll of said film rotatably supported about an axis on said frame normal to the axis of said pipe;
   means to tension and guide said film from said roll to said forward edge of said folder along said lower surface, thence rearwardly along said upper surface and said opening to form a fold rearwardly thereof about said pipe such that one longitudinal edge of said film is between said pipe and one leaf of said tubular member, while the other longitudinal edge overlaps said one edge between said leaves to form a continuous longitudinal seam rearwardly thereof; and
   means to join said seam and heat said film whereby after cooling said film will shrink tight upon said pipe.

2. Apparatus according to claim 1 wherein said tubular portion includes an exterior coaxial spring means to bias said leaves in a normally contracted position.

3. Apparatus for applying single thickness heat shrinkable synthetic resin film to the outside surface of a rigid pipe comprising:
   a support frame;
   means associated with said frame to guide and propel said pipe relative to said frame in a rearward axial direction;
   a wing shaped film folder having a longitudinal opening to permit axial movement of said pipe and supported to said frame, the forward rounded edge of said folder extending outwardly and rearwardly from said opening, the upper surface smoothly tapered downwardly and forwardly to said forward edge, the lower surface smoothly rounded upwardly and forwardly to said forward edge;
   a substantially tubular portion coaxially extending about said pipe rearwardly from said folder and having longitudinal overlapping split leaves along its upper surface, said leaves spring-flexible to permit expansion and contraction of said leaves;
   a supply roll of said film rotatably supported about an axis on said frame normal to the axis of said pipe;
   means to tension and guide said film from said roll to said forward edge of said folder along said lower surface, thence rearwardly along said upper surface and said opening to form a fold rearwardly thereof about said pipe such that one longitudinal edge of said film is between said pipe and one leaf of said tubular member, while the other longitudinal edge overlaps said one edge between said leaves to form a continuous longitudinal seam rearwardly thereof; and
   means to join said seam and heat said film whereby after cooling said film will shrink tight upon said pipe.

4. Apparatus according to claim 3 wherein said tubular portion includes an exterior coaxial spring means to bias said leaves in a normally contracted position.

5. Apparatus for applying single thickness synthetic resin film to the outside surface of a rigid pipe comprising:
   a support frame;
   means associated with said frame to self propel and guide said frame relative to said pipe in a forward direction;
   a wing shaped film folder having a longitudinal opening to permit axial movement of the said pipe, and supported to said frame, the forward rounded edge of said folder extending outwardly and rearwardly from said opening, the upper surface smoothly tapered downwardly and forwardly to said forward edge, the lower surface smoothly rounded upwardly and forwardly to said forward edge;
   a substantially tubular portion coaxially extending about said pipe rearwardly from said folder and having longitudinal overlapping split leaves along its upper surface, said leaves spring-flexible to permit expansion and contraction of said leaves;
   a supply roll of said film rotatably supported about an axis on said frame normal to the axis of said pipe;
   means to tension and guide said film from said roll to said forward edge of said folder along said lower surface, thence rearwardly along said upper surface and said opening to form a fold rearwardly thereof about said pipe such that one longitudinal edge of said film is between said pipe and one leaf of said tubular member, while the other longitudinal edge overlaps said one edge between said leaves to form a continuous longitudinal seam rearwardly thereof; and means to join said seam.

6. Apparatus for applying single thickness synthetic resin film to the outside surface of a rigid pipe comprising:

a support frame;

means associated with said frame to guide and propel said pipe relative to said frame in a rearward axial direction;

a wing shaped film folder having a longitudinal opening to permit axial movement of said pipe and supported to said frame, the forward rounded edge of said folder extending outwardly and rearwardly from said opening, the upper surface smoothly tapered downwardly and forwardly to said forward edge, the lower surface smoothly rounded upwardly and forwardly to said forward edge;

a substantially tubular portion coaxially extending about said pipe rearwardly from said folder and having longitudinal overlapping split leaves along its upper surface, said leaves spring-flexible to permit expansion and contraction of said leaves;

a supply roll of said film rotatably supported about an axis on said frame normal to the axis of said pipe;

means to tension and guide said film from said roll to said forward edge of said folder along said lower surface, thence rearwardly along said upper surface and said opening to form a fold rearwardly thereof about said pipe such that one longitudinal edge of said film is between said pipe and one leaf of said tubular member, while the other longitudinal edge overlaps said one edge between said leaves to form a continuous longitudinal seam rearwardly thereof; and means to join said seam.

References Cited by the Examiner

UNITED STATES PATENTS

| | | | |
|---|---|---|---|
| 1,969,947 | 8/1934 | Rosener | 156—461 XR |
| 2,044,456 | 6/1936 | Yeager | 156—392 XR |
| 2,368,445 | 1/1945 | Brandt | 156—465 XR |
| 2,972,457 | 7/1961 | Harrison | 156—86 XR |
| 3,042,103 | 7/1962 | McDevitt et al. | 156—289 XR |
| 3,118,800 | 1/1964 | Snelling | 156—187 XR |

FOREIGN PATENTS

| | | |
|---|---|---|
| 210,425 | 9/1957 | Australia. |
| 220,914 | 4/1959 | Australia. |
| 630,147 | 10/1949 | Great Britain. |
| 830,457 | 3/1960 | Great Britain. |

EARL M. BERGERT, *Primary Examiner.*